US008899646B2

(12) United States Patent
Wilson et al.

(10) Patent No.: US 8,899,646 B2
(45) Date of Patent: *Dec. 2, 2014

(54) GRIPPING DEVICE

(71) Applicant: Morrison Container Handling Solutions, Inc., Glenwood, IL (US)

(72) Inventors: Nick Wilson, Chicago, IL (US); Lee Kuipers, Lansing, IL (US); Mark Burk, Highland, IN (US)

(73) Assignee: Morrison Container Handling Solutions, Inc., Glenwood, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/193,678

(22) Filed: Feb. 28, 2014

(65) Prior Publication Data

US 2014/0175819 A1    Jun. 26, 2014

Related U.S. Application Data

(63) Continuation of application No. 13/679,189, filed on Nov. 16, 2012, now Pat. No. 8,672,376.

(51) Int. Cl.
*B66C 1/42* (2006.01)
*B25J 15/00* (2006.01)
*B65G 47/86* (2006.01)
*B65G 47/90* (2006.01)

(52) U.S. Cl.
CPC ........... *B25J 15/0028* (2013.01); *B65G 47/847* (2013.01); *B65G 47/90* (2013.01); *B65G 2201/0247* (2013.01)
USPC ........................................ 294/99.1; 294/116

(58) Field of Classification Search
CPC ............. B25J 7/00; B25J 15/12; B25B 5/087; B25B 5/163; Y10S 294/902
USPC ............... 294/99.1, 116, 203; 198/777, 803.9
See application file for complete search history.

(56) References Cited

U.S. PATENT DOCUMENTS

| | | | | |
|---|---|---|---|---|
| 2,817,556 | A * | 12/1957 | White | 294/116 |
| 4,093,296 | A * | 6/1978 | Itoh | 294/90 |
| 4,169,621 | A * | 10/1979 | McGill | 294/116 |
| 4,452,481 | A * | 6/1984 | Williams | 294/118 |
| 8,167,607 | B2 * | 5/2012 | Linke et al. | 425/526 |
| 8,172,290 | B2 * | 5/2012 | Nishino et al. | 294/99.1 |
| 8,191,948 | B2 * | 6/2012 | Preti et al. | 294/116 |
| 8,206,144 | B2 * | 6/2012 | Ng et al. | 425/526 |
| 8,360,492 | B2 * | 1/2013 | Winzinger et al. | 294/106 |
| 8,439,413 | B2 * | 5/2013 | Cirio | 294/116 |
| 2002/0079714 | A1 * | 6/2002 | Soucy et al. | 294/99.1 |
| 2006/0043749 | A1 * | 3/2006 | Huang et al. | 294/99.1 |
| 2010/0007160 | A1 * | 1/2010 | Glotzl | 294/88 |
| 2011/0109110 | A1 * | 5/2011 | Sarda | 294/99.1 |

* cited by examiner

*Primary Examiner* — Saul Rodriguez
*Assistant Examiner* — Gabriela Puig
(74) *Attorney, Agent, or Firm* — Quinn Law Group, PLLC.

(57) ABSTRACT

A gripper formed as a single component includes a hoop portion connecting facing arms. Each arm may have a tang end, a jaw end and a pivot intermediate the tang and jaw ends and be attached to the hoop portion at the pivot to be pivotable to change the size of a jaw opening defined by the jaw ends. The hoop portion is cyclically loaded in use and configured to act as a stress concentrator for the gripper and provide a failure point for consistently initiating a failure crack in the hoop portion at time of failure of the gripper. Each of the facing arms is attachable to a base such that at failure, the fractured portions of the gripper are retained to the base.

20 Claims, 2 Drawing Sheets

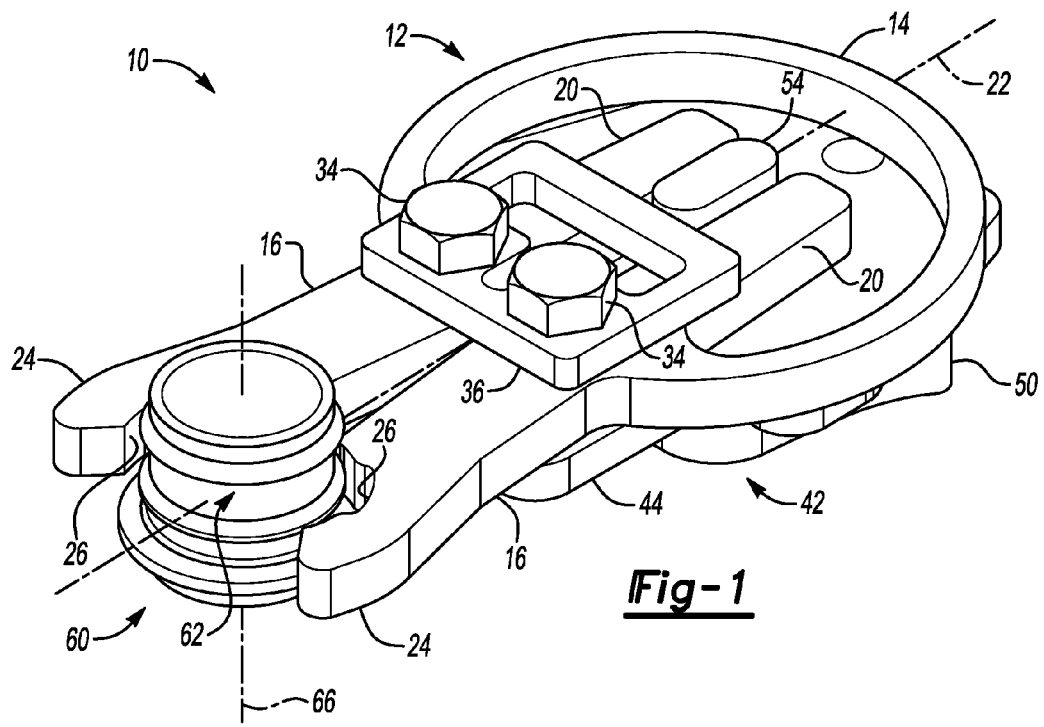
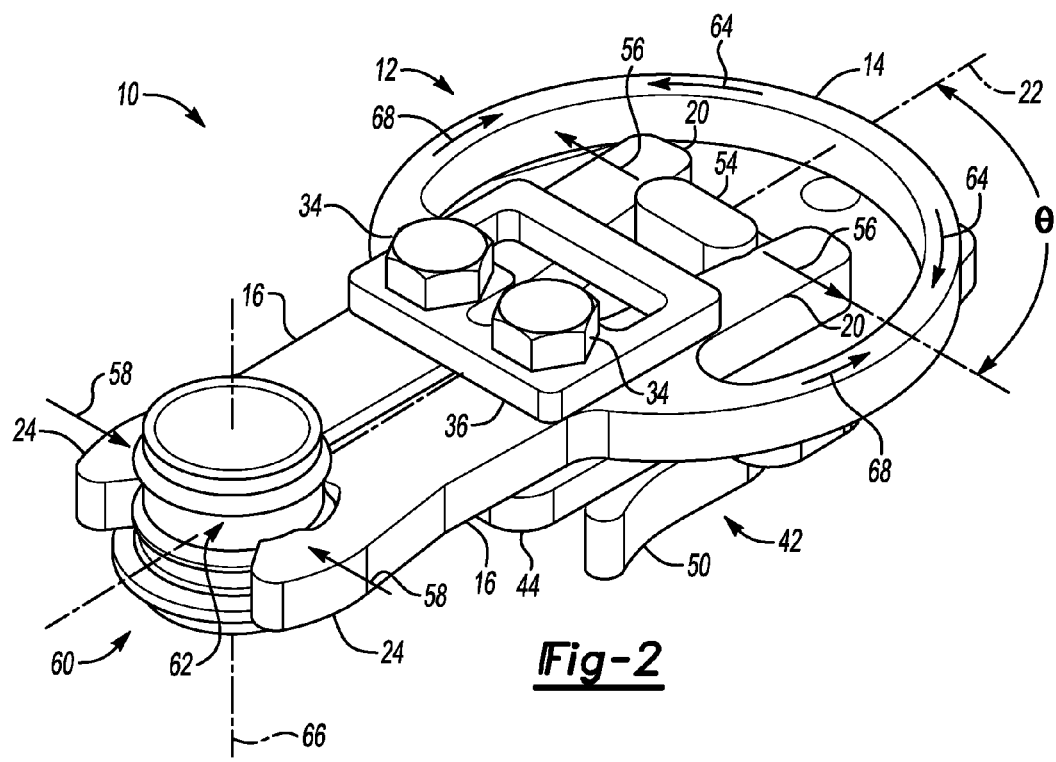

GRIPPING DEVICE

TECHNICAL FIELD

The present invention relates to a gripping device for gripping a workpiece.

CROSS-REFERENCE TO RELATED APPLICATION

This application claims the benefit of U.S. application Ser. No. 13/679,189 filed Nov. 16, 2012, which is hereby incorporated by reference in its entirety.

BACKGROUND

Gripping devices are used to grip containers during container processing, including container filling operations. Gripping devices may include numerous component parts requiring adjustment during installation, set up, and changeover to attach, center or orient the gripping device to a base plate and/or to the work piece, which may be a container, for proper gripping operation. The component parts of the gripping device may loosen, break or otherwise fail during repetitive and continuing operation of the gripping device. Loosened component parts and/or broken pieces of the gripping device component parts may fall into the container or into the container handling equipment, which may cause downtime to recover the component fragments.

SUMMARY

A gripper and a method of controlling failure of the gripper are provided herein. The gripper includes a hoop portion connecting a pair of facing arms, each defining a jaw end. The facing arms are each pivotable to open and close a jaw opening defined by the facing jaw ends. During opening and closing of the gripper, the hoop portion is subjected to cyclic loading, such that during opening of the jaw opening a tensile stress is concentrated in the hoop portion, and during closing of the jaw opening a spring force is exerted by the hoop portion in opposition to the tensile stress. The hoop portion thus configured acts as a stress concentrator within the gripper, such that over time in use, the hoop portion provides a failure point for consistently initiating a failure crack at the failure point within the hoop portion. The gripper is configured such that the facing arms of the gripper are retained to a base plate in an installed position, so that at the time a failure crack occurs in the hoop portion, the portions of the failed gripper separated by the failure crack are retained to the base plate. Controlling the failure mode to contain the fracture location to the hoop portion, and retaining each arm and attached portion of the cracked hoop portion to a base plate prevents the separated portions of the gripper from falling into a container proximate the gripper at time of failure or into handling equipment incorporating the gripper, thus preventing contamination of the container and/or downtime to recover the broken gripper fragments from the equipment.

Further, controlling the failure mode to direct the fracture location to the hoop portion results in a failure crack that is readily visible for easy detection of the failed gripper in its installed position. Controlled cracking of the hoop portion at time of failure makes the failed condition of the gripper readily apparent by rendering the gripper inoperative, thus avoiding partial or inadequate gripping of a workpiece by a failed gripper.

The gripper provided herein may be configured to grip a workpiece when the gripper is in a closed position, and to release the workpiece when the gripper is in an open position. The gripper in a closed position is configured to generate a gripping force on the workpiece interposed in the jaw opening of the gripper. Actuation of the gripper from a first position to a second position generates an opposing spring force in the gripper which causes the gripper to return to the first position upon release of the actuating force. In one example, the workpiece may be configured as a container including a necked portion, e.g., a neck, and the gripper may be configured to grip the neck of the container when the gripper is in the closed position. The gripper may be operatively attached to a base assembly to provide a gripping device. The gripping device may be in operative communication with an actuator which may be used to actuate the gripper from a first position to a second position.

In an example configuration, the gripper is formed as a single component and includes a hoop portion connecting a pair of facing arms defining a longitudinal axis of the gripper. Each of the facing arms defines a tang end, a jaw end and a pivot intermediate the tang end and the jaw end. Each of the facing arms is attached to the hoop portion adjacent the pivot and is pivotable by lateral displacement of the tang end of the arm relative to the longitudinal axis to change the size of a jaw opening defined by the jaw ends of the pair of facing arms. The hoop portion, which may be generally arcuate, is configured to enclose the tang ends of the pair of facing arms and to generate a spring force opposing the direction of pivoting of each arm of the facing arms. The facing arms may be symmetrical to one another relative to the longitudinal axis such that the jaw opening is self-centering relative to the longitudinal axis of the gripper. The gripper may be operatively connected to a base assembly to form a gripping device, wherein the base assembly may be configured to retain the gripper in an oriented position relative to an actuator, such that the gripper is in operable communication with the actuator.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective top view of a gripping device including a gripper in an open position;

FIG. 2 is a schematic perspective top view of the gripping device of FIG. 1 with the gripper in a closed position.

DETAILED DESCRIPTION

Figure 3:
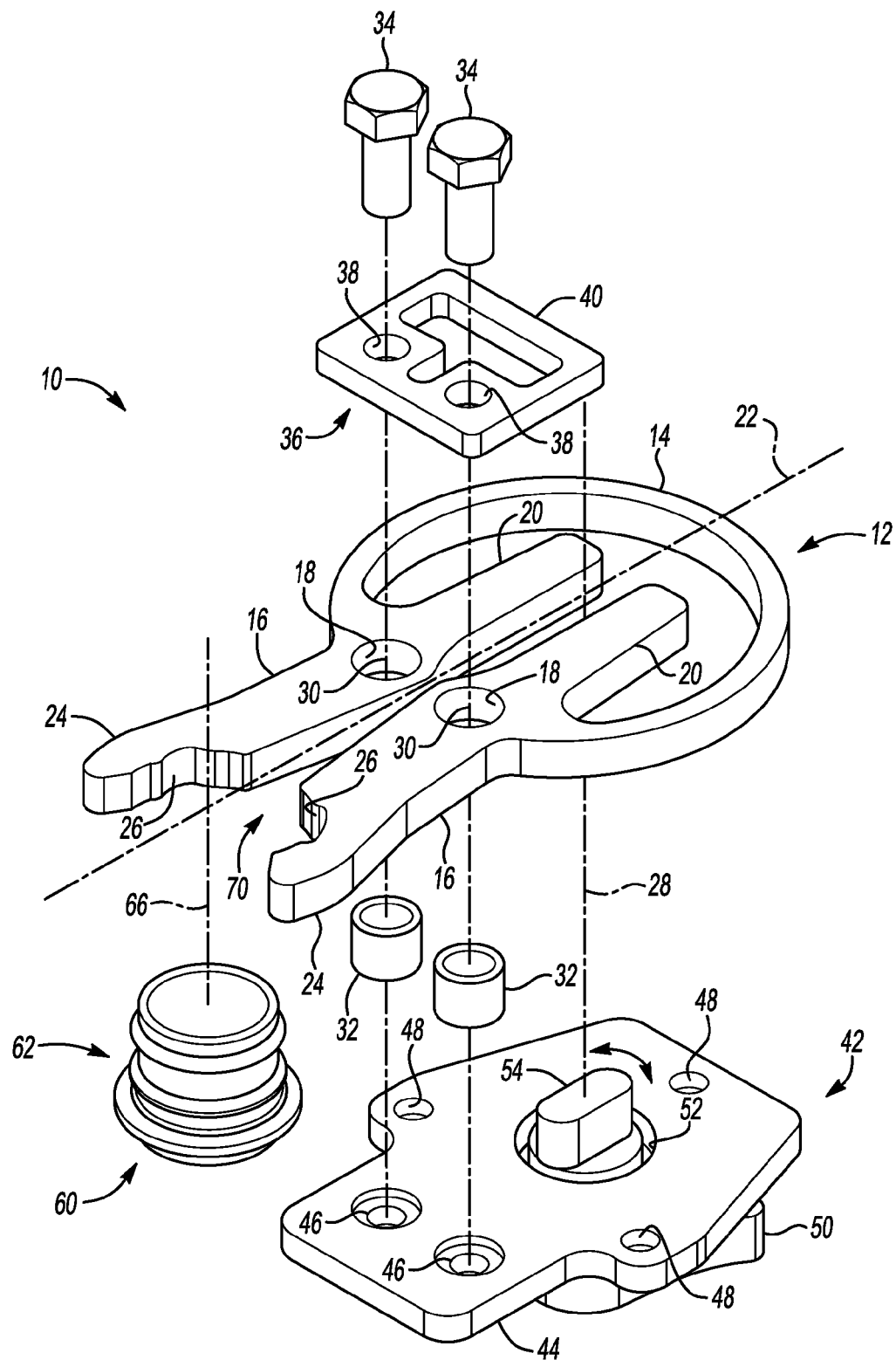
FIG. 3 is a schematic exploded view of the gripping device of FIG. 1.

Referring to the drawings wherein like reference numbers represent like components throughout the several figures, the elements shown in FIGS. 1-3 are not necessarily to scale or proportion. Accordingly, the particular dimensions and applications provided in the drawings presented herein are not to be considered limiting. A gripper generally indicated at 12 in FIG. 1, and a method of controlling failure of the gripper 12, are provided herein. The gripper 12 includes a hoop portion 14 connecting a pair of facing arms 16, each defining a jaw end 24. As shown in FIG. 3, the facing arms 16 are each pivotable about a respective pivot axis 30 to open and close a jaw opening 70 defined by the facing jaw ends 24. The gripper 12 may be operatively attached, as shown in FIG. 1, to a fixture or base assembly generally shown at 42 to provide a gripping device generally indicated at 10. In the example shown, the base assembly 42 includes a base plate 44, and each arm 16 of the gripper 12 is operatively attached to the base plate 44 by a retainer plate 36 and a respective fastener 34. During opening and closing of the gripper 12, the hoop portion 14 is subjected to cyclic loading, such that during opening of the jaw opening 70, a tensile stress 64 (see FIG. 2) is concentrated in the hoop portion 14, and during closing the hoop portion 14 exerts a compressive stress 68 which acts as a spring force in opposition to the tensile stress 64. The hoop portion 14 thus configured acts as a stress concentrator within the gripper 12, such that over time in use, the hoop portion 14 provides a failure point for consistently initiating a failure crack at the failure point within the hoop portion 14. The gripper 12 is configured such that at the time a failure crack occurs in use, the facing arms 16 of the gripper 12 are retained to a base plate 44 in an installed position by the fasteners 34 and the retainer plate 36, so that the portions of the failed gripper 12 separated by the failure crack are retained in place, e.g., in the installed position shown in FIGS. 1 and 2.

Controlling the failure mode to contain the fracture location to the hoop portion 14, and retaining each facing arm 16 to the base plate 44 and/or between the base plate 44 and the retainer plate 36 prevents the separated portions of the gripper 12 from falling into a container 60 proximate the gripper 12 at time of failure or into the container handling equipment (not shown), thus preventing contamination of the container 60 and/or downtime of the container handling equipment. Further, controlling the failure mode to direct the fracture location to the hoop portion 14 of the gripper 12 results in a failure crack that is readily visible for easy detection of the failed gripper 12. Controlled cracking of the hoop portion 14 at time of failure makes the failed condition of the gripper 12 readily apparent by rendering the gripper 12 and/or gripping device 10 inoperative, thus preventing partial or inadequate gripping of a container 60 being introduced to the jaw opening 70. By configuring the gripper 12 as a singular component, and by controlling the failure mode such that the gripper 12 fractures into two portions, changeover time to replace a failed gripper 12 with a new gripper 12 is minimized to removing and reinstalling the two fasteners 34 and the retainer plate 36, thus minimizing equipment downtime attributable to gripper replacement.

As shown in FIG. 2, the gripper 12 may be configured to grip a workpiece 60 when the gripper 12 is in a closed position, and to release the workpiece 60, as shown in FIG. 1, when the gripper 12 is in an open position. The gripper 12 in a closed position is configured to generate a gripping force on the workpiece 60 interposed in the jaw opening 70 of the gripper 12. Actuation of the gripper 12 from a first position shown in FIG. 1 to a second position shown in FIG. 2 generates an opposing spring force 68 in the gripper 12 which causes the gripper 12 to return to the first position upon release of the actuating force. In one example, the workpiece 60 may be configured as a container including a necked portion or neck 62, and the gripper 12 may be configured to grip the neck 62 of the container 60 when the gripper 12 is in the closed position. The gripper 12 may be operatively attached to a base assembly generally indicated at 42 to provide a gripping device 10. The gripping device 10 may be in operative communication with an actuator 54 which may be used to actuate the gripper 12 from a first position to a second position.

Referring to FIGS. 1 and 2, shown is a schematic perspective top view of a gripping device generally indicated at 10, including a gripper generally indicated at 12 and operatively connected to a gripper base generally indicated at 42. In FIG. 1, the gripping device 10 and gripper 12 is shown in a non-actuated or deactuated state, with the gripper 12 in an open position such that a workpiece generally indicated at 60 is not retained by the gripper 12. In FIG. 2, the gripping device 10 and gripper 12 is shown in an actuated state, with the gripper 12 in a closed position and gripping a neck portion 62 of the workpiece 60.

The gripper 12 may be molded as a single piece element from a polymer-based material. By way of example, the gripper 12 may be molded from an acetal-based polymer, a polyacetal polymer, a polyoxymethylene (POM) polymer, or similar polymeric material. In one example, the gripper 12 is formed of Delrin® type material. The gripper 12 is formed in one continuous piece, as a single element. Because the gripper 12 is formed as a single continuous piece, there are no attached parts which may loosen, break away or become disconnected from the gripper 12 during operation or at end of useful life, e.g., at time of failure of the gripper 12. The single piece construction of the gripper 12, as compared with multi-piece gripping mechanisms, substantially eliminates the probability of gripper component parts or the fractured portions of a failed gripper 12 from falling into the equipment to which the gripper device 10 is attached, or into or on to containers which may be processed by equipment including the gripper device 10.

Referring to FIG. 3, the gripper 12 is shown in additional detail. The gripper 12 includes an arcuate portion 14, which may be referred to herein as a hoop portion or hoop. The hoop portion 14 defines a vertical (as shown on the page) hoop axis or center line 28 and attaches a pair of facing arms 16. The hoop portion 14 may be substantially circular in shape. Each of the pair of facing arms 16 includes a first end or tang 20, a second end or jaw 24, and a pivot interface 18 centrally located between the tang 20 and the jaw 24. The facing arms 16 may configured as symmetrical mirror images of one another, as shown in FIGS. 1-3. The hoop portion 14 attaches to each facing arm 16 centrally between the tang 20 and jaw 24 and immediately adjacent or proximate to the pivot interface 18 of the arm 16, such that each end of the arcuate hoop portion 14 terminates in alignment with or generally coincident with a pivot axis 30 defined by the pivot interface 18, and the hoop portion 14 encloses the tang ends 20 of the pair of arms 20. The transition from the facing arm 16 to the hoop portion 14 is tapered as shown in FIGS. 1-3, such that the cross-sectional profile of the hoop portion 14 is characterized by a smaller cross-sectional area relative to the remainder of the gripper, e.g., relative to non-hoop portions of the gripper 12. For example, the cross-sectional area of the hoop portion 14 is smaller than the cross-sectional area of each facing arm 16, smaller than the cross-sectional area of each of the tang ends 20, and smaller than the cross-sectional area of each of the jaw ends 24.

During opening of the gripper 12, as described in additional detail herein, an actuating force exerted on the tang ends 20 by the actuator 54 and a resistive force exerted on the jaw ends 24 by the gripped workpiece 60 generates a tensile load 64 in the hoop portion 14. During closing of the gripper 12, the actuating force exerted on the tang ends 20 and the resistive force exerted on the jaw ends 24 are relieved, and the hoop portion 14 exerts a spring force 68 to return the facing arms 16 to their open position. Repeated opening and closing of the gripper 12 results in cyclic or fatigue loading of the hoop portion 14 by the alternating tensile stress 64 and the spring force 68. By concentrating the fatigue stress in the hoop portion 14, the failure mode of the gripper 12 may be controlled, resulting in fatigue cracking of the hoop portion 14 prior to failure of any other portion of the gripper 12. At time of failure, fatigue cracking of the hoop portion 14 would cause separation of the gripper 12 into two separated portions, each including one of the facing arms 16 and an attached part of the fractured hoop portion 14. Each separated portion of the gripper 12 would be retained to the base assembly 42 by a respective fastener 34 and/or the retainer plate 36, such that neither of the separated portions would be loosened or dislodged from the base assembly 42.

The example of a substantially circular hoop portion 14 is intended to be non-limiting and other configurations of the hoop portion may be used. For example, the arcuate hoop portion 14 may be oval or otherwise non-circular, or may be defined by a polygonal shape such as a rectangle or triangle. The cross-sectional profile of the hoop portion 14 may be oval or define a polygonal shape other than a rectangle.

Each of the jaws 24 define a jaw face 26 configured to provide a gripping surface to grip a workpiece 60. The pair of jaw faces 26 define a jaw opening 70 (see FIG. 3). The workpiece 60 may define a grippable interface 62, and the jaw face 26 and/or gripper 12 may be configured for gripping the grippable interface 62 when the gripper 12 is actuated as described further herein to retain the workpiece 60 between the jaws 24 of the gripper 12. In a non-limiting example, the workpiece 60 may be configured as a container such as a bottle, and the grippable interface 62 may be defined by a portion of the container such as a neck, a head or a cap portion of the container, a container closure such as a bottle cap affixed to the container, etc. The pivot interface 18 of each arm 16 defines a vertical (as shown on the page) pivot axis 18 about which the arm 16 is rotatable when the gripper 12 is actuated or deactuated.

The gripper 10 defines a longitudinal axis 22 which is perpendicular to the pivot axes 30. The longitudinal axis 22 may be perpendicular to the jaw centerline 66, but is not required to be, for example, in a configuration where the jaws 24 are configured to grip a workpiece at an angle non-perpendicular to longitudinal axis 22 of the gripper 12. The longitudinal axis 22 bisects the hoop portion 14, intersects the jaw centerline 66 and is substantially equidistant between the parallel pivot axes 30.

As shown in FIGS. 1-3, the facing arms 16 may be configured as symmetrical mirror images of each other with respect to the longitudinal axis 22. In the present example, the gripper 10 may be configured with the facing arms 16 skewed in mirror image to each other and with respect to the longitudinal axis 22, such that in the neutral, non-actuated position, the tang end 20 of each arm 16 is relatively closer to the longitudinal axis 22 than the jaw end 24 of the respective arm, to provide a wider jaw opening 70 when the gripper 10 is in the non-actuated state.

In use, each arm 16 of the gripper 12 may be rotated about its pivot axis 30 to laterally displace its tang end 20 away from the longitudinal axis 22 in the direction shown by the arrows 56 in FIG. 2 while laterally displacing its jaw end 24 toward the longitudinal axis 22 in the direction 58 shown in FIG. 2, and vice versa. Laterally displacing the tang end 20 of the arm 16 away from the longitudinal axis 22 as indicated by the arrow 56 exerts a stress or tensile force indicated at 64 on the hoop portion 14 and causes the arm 16 to rotate about the pivot axis 30 where the arcuate hoop portion 14 terminates into the arm 16, to close the jaw face 26 laterally inward toward the longitudinal axis 22. The hoop portion 14 when stressed by the tensile force 64 generates spring force 68 in opposition to the force displacing the tang 20 away from the longitudinal axis 22. The spring force 68 causes the displaced arm 16 to rotate toward the neutral (open) position in response to a reduction in or elimination of the tang displacing force, e.g. to spring back to the first position, and compression of the hoop portion 14.

As shown in FIGS. 1-3, the gripper 12 may be operatively attached to a gripper base assembly generally indicated at 42 to provide a gripping device 10. The base assembly 42, referred to herein as the gripper base or base, may include, for example and as shown in FIGS. 1-3, a main base plate 44 and a retainer plate 36 configured to receive and position the gripper 12 such that the gripper 12 is retained in operative communication with an actuator 54. The base 42 includes a pair of fasteners 34 received through openings 38 in the retainer plate 36 and the pivot interfaces 18 of the gripper 12 for attachment to the base plate 44 such that each of the arms 16 is pivotable about its respective pivot axis 30. In one example, the fastener 34 may be configured as a bolt, pinion, or other fastener attachable to an opening 46 defined by the base plate 44. In one example, the opening 46 may be threaded and the fastener 34 may be configured as a bolt which may be threaded into the opening 46. Other forms of fasteners 34 may be used, including fasteners configured for quick changeover, and the example of a bolt is intended to be non-limiting. Each pivot interface 18 may be configure to receive a bushing or sleeve 32 through which the fastener 34 is inserted, to facilitate pivoting of the arm 16 about the pivot axis 30 and/or to prevent wear or distortion of the pivot interface 18. The retainer plate 36 may include an extended portion 40 to retain the gripper 10 in contact with the surface of the base plate 44. The retainer plate 36 may be configured retain the gripper 10 against the base plate 44 to stabilize and support the gripper during actuation and pivoting of the arms 16, and/or to minimize flexing or twisting of the arms 16 and/or hoop portion 14, which may extend the useful life of the gripper 12.

The base 42 may be configured to position the gripper 12 in operative communication with an actuator 54, where the actuator 54 is configured to actuate the gripper 12 from an open position to a closed position to grip a gripping interface 62 of a workpiece 60 located proximate to the jaw faces 26 of the gripper 12 as described in further detail herein. The gripping device 10 may be incorporated into machinery or equipment configured to handle or process one or more workpieces 60, where processing of the workpiece 60 requires gripping the workpiece 60 to transport and/or manipulate the workpiece 60 during processing, for example, wherein the gripping device 10 may be movably attached to the equipment, or the base 42 may be attached to a movable portion of the equipment such as a conveyor belt, transfer line, robot, etc. The base plate 46 may include one or more interfaces 48 for fastening the gripping device 10 to the equipment or relative to the actuator 54. The actuator 54 may be provided by the equipment to which the gripping device 10 is incorporated, and the base plate 46 may include an interface such as the aperture 52 configured to place the actuator 54 in operative communication with the gripper 12.

In the example shown in FIGS. 1-3, the actuator 54 is configured as a rotatable pin which may be interposed between the tangs 20 of the gripper 12 in use. The actuator 54 defines an axis of rotation 28 and is positioned relative to the gripper 12 and tangs 20 such that the axis of rotation 28 intersects the longitudinal axis 22. An actuating mechanism 50 may be operatively attached to the actuator 54 and configured to rotate the actuator 54 clockwise (as shown on the page) between a first position shown in FIG. 1 and a second position shown in FIG. 2, and to rotate the actuator counterclockwise (as shown on the page) between the second position shown in FIG. 2 and the first position shown in FIG. 1. By way of example, the actuating mechanism 50 may be a lever which may be movable between a first position shown in FIG. 1 and a second position shown in FIG. 2 to rotate the actuator 54 clockwise and counter-clockwise between the first position shown in FIG. 1 and the second position shown in FIG. 2, respectively. In the example shown, the first position of FIG. 1 corresponds to a non-actuated position, where the gripper 12 is in a neutral state with the jaws 24 fully open, such that the size of the jaw opening 70 (see FIG. 3) is maximized. The second position of FIG. 2 corresponds to a fully actuated position, where the actuator 54 is positioned to maximize displacement of the tangs 20 and pivoting of the arms 16 to rotate the jaws 24 to a fully closed position, such that the size of the jaw opening 70 is minimized, or when the jaws 24 are engaged with a workpiece 60 located in the jaw opening 70, the gripping force exerted by the jaws 24 on the workpiece 60 is maximized. The actuating mechanism 50 may be configured for or be adjustable to one or more intermediate positions, where each intermediate position corresponds to a rotation of the actuator 54 between the first position and second position, to actuate the gripper 12 to a predetermined size of the jaw opening 70 or predetermined gripping force exerted by the jaws 24 on a workpiece 60 between that of the fully open and fully closed gripper positions.

In the first position shown in FIG. 1, the actuator 54 may be proximate to the tangs 20 with minimal or no contact between the actuator 54 and the tangs 20, such that the actuator 54 does not exert a displacing force on the tangs 20 and the gripper 12 is in a non-actuated (neutral) position with the jaws 24 in a fully open position. The actuator 54 is aligned with the longitudinal axis 22 such that the rotational position of the actuator 54 may be expressed in terms of an angle of rotation θ of the actuator 54 relative to the longitudinal axis 22 (see FIG. 2). In the first position shown in FIG. 1, the angle of rotation θ of the actuator 54 is zero, such that the arms 16 are not pivoted and the hoop portion 14 is not stressed.

In a jaw closing sequence, rotation of the actuator 54 to an angle θ>0, e.g., clockwise in the present example, causes the actuator 54 to initially contact the tangs 20 and exert an actuating force on each of the tangs 20 to displace the tangs 20 away from the longitudinal axis 22 as indicated by the arrows 56 shown in FIG. 2. Displacement of each of the tangs 20 away from the longitudinal axis 22 causes each of the respective arms 16 to pivot about its respective pivot axis 30 such that the jaws 24 are pivoted toward each other and the longitudinal axis 22 as indicated by the arrows 58, to reduce the size of the jaw opening 70 (see FIG. 3). As the actuator 54 is further rotated to increase θ, e.g., clockwise in the present example, the tangs are further displaced in the direction of the arrows 56 and the jaws 24 are further closed in the direction 58. As the jaws 24 progressively close, the jaws 24 may first contact a workpiece 60 located in the jaw opening 70, and such that a gripping force is exerted on the contacted workpiece 60 to retain the workpiece 60 in the gripper 12. A resistive force is exerted on the jaw ends 24 by the gripped workpiece 60, and in opposition to the gripping force exerted by the jaw ends 24 on the workpiece 60. The gripping force exerted on the workpiece 60 and the resistive force exerted on the jaw ends 24 increases as the displacement of the tangs 20 from the longitudinal axis 20 increases, e.g., as θ approaches 90 degrees. Gripping force exerted on the workpiece 60 by the gripper 12, in the example shown, is maximized when the actuator 54 is rotated substantially perpendicular to the longitudinal axis 22, i.e., θ=90 degrees, and displacement of the tangs 20 away from the longitudinal axis 22 is maximized, as shown in FIG. 2. The second position corresponding to θ=90 degrees represents a fully closed position of the gripper 12. In the fully closed position, a maximum gripping force is exerted on a workpiece 60 located in the jaw opening 70 and a maximum resisting force is exerted on the jaw ends 24 by the gripped workpiece 60, or in the absence of a workpiece 60, the jaw opening 70 is minimized, e.g., is at its minimum size. During the closing sequence, the pivoting of the arms 16 as the tangs 20 are displaced away from the longitudinal axis 22 creates tensile stresses 64 in the hoop portion 14. Compressive spring forces 68 are generated in the hoop portion 14 opposing the tensile stresses 64 and resisting pivoting of the tangs 20 away from the longitudinal axis 22. Throughout the jaw closing sequence, the jaw opening 70 remains centered with respected to the longitudinal axis 22, such that the centerline 66 of the jaw opening intersects the longitudinally axis 22 during symmetrical pivoting of the facing arms 16.

In a jaw opening sequence, rotation of the actuator 54 to an angle θ<90, e.g., counterclockwise in the present example, decreases the actuating force exerted by the actuator 54 on each of the tangs 20. As the actuating force exerted by the actuator 54 on each of the tangs 20 is decreased, the spring forces 68 act upon the arms 16 to pivot the tangs 20 toward the longitudinal axis 22 such that the tangs 20 are maintained in contact with the rotating actuator 54 and the jaws 24 are pivoted away from each other and the longitudinal axis 22, to increase the size of the jaw opening 70. As the actuator 54 is further rotated to decrease θ, e.g., counterclockwise in the present example, the spring forces 68 continue to act upon the arms 16 to maintain the tangs in contact with the actuator and to further open the jaws 24. As the jaws 24 progressively open, the size of the jaw opening 70 increases and the jaws 24 progressively reduce the gripping force exerted on the workpiece 60 located in the jaw opening 70 until the gripping force is reduced sufficiently to release the workpiece 60 from the jaws 24, e.g., when gripping contact with the workpiece 60 is eliminated. The spring force exerted on the arms 16 by the hoop portion 14 decreases as the displacement of the tangs 20 from the longitudinal axis 20 decreases, e.g., as the angle of rotation of the actuator θ approaches 0 degrees and the gripper 12 is returned to its first position, wherein the hoop portion 14 is no longer stressed and the jaws 24 are fully opened. As the jaws 24 are opened, the actuating force exerted by the actuator on the tang ends 20 and the resistive force exerted by the gripped workpiece 60 on the jaw ends 24 reduces to zero, as the gripper resumes a neutral position. Throughout the jaw opening and closing sequences, the jaw opening 70 is self-centering, e.g., remains centered with respected to the longitudinal axis 22 such that the centerline 66 of the jaw opening intersects the longitudinally axis 22 during symmetrical pivoting of the facing arms 16.

The jaw opening and closing sequences are repeated by the gripping device 10 in use, such that repeated cyclic loading of the gripper 12 occurs. During cyclic loading of the gripper 12, the cyclic load exerted by the actuator 54 would vary from a neutral condition with the jaws open where substantially no load is exerted on the tang ends 20 or on the jaw ends 24, to a maximum load condition with the jaws fully closed corresponding to a maximum tensile actuating load exerted by the actuator 54 on the tang ends 20 and a maximum resistive load exerted by the gripped workpiece 60 on the jaw ends 24. Therefore, the cyclic load exerted on each of the tang ends 20 and the jaw ends 24 is a tensile-neutral load cycle, varying between no load and maximum tensile load conditions, and neither of the tang ends 20 nor the jaw ends 24 are compressively loaded in use. In contrast, during cyclic loading the hoop portion 14 is subjected to tensile loading 64 during jaw closing and compressive or spring loading 68 during jaw opening, such that the cyclic load concentrated on the hoop portion 14 varies from a tensile load through a neutral or no load point to a compressive load. Therefore the cyclic load, e.g., the fatigue stress exerted on the hoop portion 14 is a tensile-compressive load cycle, varying between tensile load conditions and compressive load conditions. Because of the severity of the tensile-compressive load cycle exerted on the hoop portion 14 relative to the tensile-neutral load cycle exerted on the tang ends 20 and the jaw ends 24 and/or the relative smaller area of the cross-sectional profile of the hoop portion 14 compared to the larger area of each of the cross-sectional profiles of the tang ends 20 and jaw ends 24, the cycle life time of the hoop portion 14, defined as the number of load cycles until end of useful life corresponding to fracture of the hoop portion 14, is less than the cycle life time of other loaded portions of the gripper 12, specifically the tang ends 20 and jaw ends 24. As so configured and loaded, the hoop portion 14 acts as a stress concentrator for the gripper 12 and provides a failure point for consistently initiating a failure crack in the hoop portion 14 at the end of useful life of the gripper 12, e.g., at such time that the cycle life time of the hoop portion 14 is exceeded.

The configuration of the actuator 54 shown in FIGS. 1-3 is not intended to be limiting, and other forms of actuators configurable to actuate the grippers 12 as described herein may be used. For example, it would be understood that the actuating mechanism 50 may be configured such that the actuator 54 may be rotated 360 degrees. In this configuration, and referring to FIGS. 1 and 2, the gripper 12 would be non-actuated or in a neutral position when the actuator is rotated to θ=0 deg. or θ=180 deg., and the gripper 12 would be in a fully closed (second) position when the actuator is rotated to θ=90 deg. or θ=270 deg. Further, the gripper 12 would be in a closing sequence when θ is increasing and 0≤θ<90 or 180<θ≤270, and the gripper 12 would be in an opening sequence when θ is increasing and 90<θ≤180 or 270<θ≤360.

In another example, the size and/or shape of the actuator pin 54 may be varied to change the amount of displacement of the tang from the longitudinal axis, thereby changing the closed distance between the gripping faces 26 and/or the gripping force exerted by the gripping faces 26 on the object 60 being gripped. The configuration of the actuator pin 54 may be asymmetrical (not shown) such that when actuated, each of the tangs 20 are displaced a different distance from the longitudinal axis 22 of the gripper 12 to offset the centerline of the gripping faces 26 from the longitudinal axis 22 of the gripper 12, for example, to grip an asymmetrical workpiece 60. The configuration of the actuator pin 54 may be modified such that the maximum gripping force is exerted when the pin is rotated to an angle other than 90 degrees or 270 degrees. The actuator pin may be configured such that in the non-actuated position, e.g., at θ=zero degrees, the actuator pin 54 nominally contacts the tangs 20 to remove any clearance or slack between the actuator 54 and the tangs 20, to eliminate any delay in actuation of the gripper 12 for take-up of the slack or clearance.

The symmetrical configuration of the gripper 12 and symmetrical displacement of the tangs 20 in use causes the facing arms 16 to pivot equally relative to the longitudinal axis 22, maintaining the centerline 66 of the jaw opening in a constant position with respect to the gripper 12 and the gripping device 10, such that the gripper 12 and gripping device 10 is self-centering. The gripper 12 and gripping device 10 described herein provides an advantage by not requiring adjustment during installation to center the jaws 24 relative to the workpiece 60, and by not requiring adjustment in use to maintain centering of the gripper 12. The gripper 12 is further advantaged by being configured for quick changeover and/or adjustment of the gripping pressure exerted by the jaws 24 and/or the closed size of the jaw opening 70.

Referring again to FIG. 2, the gripping device 10 may be easily adjusted when changing over from processing the workpiece 60 to processing of a second workpiece (not shown) having a gripping interface 62 different from the first workpiece 60. In a first example, the second workpiece may have a gripping interface 62 with a larger cross-sectional area than the first workpiece 60, such that full rotation of the actuator 54 to 90 degrees would exert a higher gripping pressure on the second workpiece relative to the gripping pressure exerted on the first workpiece 60. The gripping device 10 may be adjusted to limit the angle of rotation θ corresponding to a fully closed position to θ≤90, thereby reducing the displacement of the tangs 20 and reducing the inward pivoting of the jaws 24 to maintain the same gripping pressure for the first and second workpieces. In another example, a third workpiece (not shown) may have a gripping interface 62 with a smaller cross-sectional area than the first workpiece 60, such that full rotation of the actuator 54 shown in FIG. 2 may not displace the tangs 20 sufficiently to pivot the arms 16 to provide a minimum gripping pressure on the third workpiece. Quick changeover may be accomplished by substituting a larger actuator pin for the actuator pin 54 to increase displacement of the tangs 20 away from the longitudinal axis 22, thereby increasing the gripping pressure on the smaller third workpiece, without having to change out the gripper 12.

In another example, the gripper 12 can be changed to another (second) gripper (not shown) differing from gripper 12 in the configuration of the jaw ends 24 or jaw faces 26 to provide a different gripping pressure or jaw opening size, while maintaining the pivot interface 18 and tang 20 configuration of the gripper 12 such that the gripper base 42 requires no adjustment or modification to receive the second gripper. In this example, changeover from the gripper 12 to the second gripper is limited to removing the two fasteners 34 and the retaining plate 36, replacing the gripper 12 with the second gripper, and replacing the retainer plate 36 and the two fasteners 34. Similar to the first gripper, the second gripper is configured as a self-centering, as described previously, such that no further adjustment of the second gripper is required after being fastened to the base 42 to align, for example, the centerline of the jaw opening to the base 42.

The relatively low cost to produce the molded single element gripper 12 may enable use of the gripper 12 as a disposable element, such that in the event of wear, contamination, damage, etc., the gripper 12 may be recycled or disposed of and replaced with another gripper 12 at reasonable to nominal cost. Because the gripper 12 is self-centering and does not require adjustment at initial installation or over time in use, is of low cost to produce, and does not include other parts such that no assembly or rebuild is required, operating costs associated with use of the gripper 12 may be substantially less than operating costs associated with other multi-piece grippers.

The examples shown in FIGS. 1-3 of the gripper 12 are not intended to be limiting. Other configurations of a single piece gripper are possible. For example, the gripping surfaces 26 of the jaws 24 may differ from one another to be configured to grip a non-symmetrical workpiece. The arms 16 may be non-symmetrical to each other or to the longitudinal axis 22 to provide a jaw opening which is self-centering to a centerline laterally offset from the longitudinal axis of the gripper.

The gripper 10 may be configured such that the non-actuated or neutral position of the facing arms 16 correspond to a fully closed position, and the gripper 10 is actuated by displacing the tang ends 20 laterally toward the longitudinal axis 22 to pivot the jaws 24 laterally away from the longitudinal axis to a second position which is an open position. This configuration may be beneficial where it is desired that the default position of the gripper be the fully closed position. In the present example, the gripping device 10 may be configured to interface with an actuator arranged to compress the tangs 20 together to displace the tangs 20 laterally toward one another during actuation. Compression of the tangs 20 toward each other to rotate the arms 16 and pivot the jaws 24 away from each other creates a stress in the hoop portion 14 and generates a spring force in the hoop portion 14 opposing the compression of the tangs 20 such that the arms 16 spring back to the neutral closed position as the actuating force is reduced or relieved. In this example, the gripper 10 may be configured with the facing arms 16 skewed in mirror image to each other and with respect to the longitudinal axis, such that in the neutral position, the jaw end 24 of each arm 16 is relatively closer to the longitudinal axis 22 than the tang end 20 of the respective arm.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A gripper configured to fail in a controlled manner, the gripper comprising:
   a hoop portion connecting a pair of facing arms defining a longitudinal axis of the gripper;
   wherein each of the facing arms:
      defines a pivot axis at an intermediate position within the respective facing arm;
      is attached to the hoop portion adjacent the pivot axis; and
      is pivotable relative to the longitudinal axis;
   wherein the hoop portion is configured to provide a failure point in the hoop portion for consistently initiating a failure crack in the hoop portion at time of failure of the gripper.

2. The gripper of claim 1, wherein:
   each of the facing arms includes a first end and a second end; and
   the pivot axis is intermediate the first end and the second end.

3. The gripper of claim 2, wherein the first ends are enclosed by the hoop portion.

4. The gripper of claim 2, wherein:
   the first ends of the facing arms oppose each other relative to the longitudinal axis; and
   the second ends of the facing arms oppose each other relative to the longitudinal axis.

5. The gripper of claim 2, wherein the second ends of the facing arms define a jaw opening; and
   the size of the jaw opening is changeable by pivoting at least one of the facing arms relative to the longitudinal axis.

6. The gripper of claim 2, wherein the hoop portion is characterized by a smaller cross-sectional area relative to each of the cross-sectional areas of the first ends and the second ends.

7. The gripper of claim 1, wherein the hoop portion defines a stress concentrator relative to non-hoop portions of the gripper.

8. The gripper of claim 1, wherein the gripper is formed in a single piece.

9. A gripping device configured to fail in a controlled manner, the gripping device comprising:
   a gripper defining a pair of facing arms and a hoop portion connecting the pair of facing arms;
   wherein:
      the hoop portion is connected to a mid-portion of each respective arm of the facing arms to define a respective pivot about which the respective arm is pivotable relative to a longitudinal axis of the gripper; and
      the hoop portion is configured as a stress concentrator such that the gripper fails in a controlled manner by formation of a failure crack in the hoop portion.

10. The gripping device of claim 9, further comprising:
    a base plate configured to receive the gripping device; and
    wherein after controlled failure of the gripper by formation of the failure crack in the hoop portion, the gripper is fully retained to the base assembly.

11. The gripping device of claim 9, further comprising:
    an actuator actuable to concurrently pivot the facing arms in opposing directions relative to the longitudinal axis.

12. The gripping device of claim 11, wherein concurrently pivoting the facing arms in opposing directions relative to the longitudinal axis generates a spring force in the hoop portion opposing the pivoting of the facing arms.

13. The gripping device of claim 11, wherein when the actuator is deactuated, a spring force exerted by the hoop portion returns the facing arms to a neutral position.

14. The gripping device of claim 11, further comprising:
    a lever operatively attached to the actuator;
    wherein rotation of the lever actuates the actuator.

15. A method of controlling the failure of a gripping device configured to grip a workpiece, the method comprising:
    providing a gripper defining a pair of facing arms and a hoop portion connecting the pair of facing arms;
       wherein the hoop portion is connected to a mid-portion of each respective arm of the facing arms to define a respective pivot about which the respective arm is pivotable relative to a longitudinal axis of the gripper;
       wherein the hoop portion is configured to provide a stress concentrator in the hoop portion for consistently initiating a failure crack in the hoop portion at time of failure of the gripper; and
    actuating the gripper by pivoting the facing arms in opposing directions relative to the longitudinal axis.

16. The method of claim 15, wherein:
    each of the facing arms includes a first end and a second end; and
    actuating the gripper further comprises:
       exerting a displacing force on the first ends of the facing arms to pivot the facing arms in opposing directions relative to the longitudinal axis.

17. The method of claim 15, wherein actuating the gripper generates a spring force in the hoop portion in opposition to the pivoting of the facing arms, the method further comprising:
    deactuating the gripper such that the spring force returns the facing arms to a neutral position.

18. The method of claim 15, further comprising:
    actuating the gripper by rotation of an actuator disposed between the facing arms.

19. The method of claim 18, wherein:
    the actuator is operatively connected to a lever;
    the method further comprising:
       moving the lever from a first position to a second position to actuate the gripper; and moving the lever from the second position to the first position to deactuate the gripper.

20. The method of claim 18, wherein actuating the gripper further comprises:
modifying a jaw opening defined by the facing arms between a closed position and an open position.

* * * * *